(12) United States Patent
Jesser

(10) Patent No.: US 9,987,711 B2
(45) Date of Patent: Jun. 5, 2018

(54) WELDING TOOL COUPLING HAVING AT LEAST ONE MAGNET SYSTEM AND AT LEAST ONE SHORT-CIRCUIT DEVICE, WELDING TOOL, AND WELDING DEVICE

(71) Applicant: Alexander Binzel Schweisstechnik GmbH & Co. KG, Buseck (DE)

(72) Inventor: Gabriel Jesser, Marburg (DE)

(73) Assignee: ALEXANDER BINZEL SCHWEISSTECHNIK GMBH & CO. KG, Buseck (DE)

( * ) Notice: Subject to any disclaimer, the term of this patent is extended or adjusted under 35 U.S.C. 154(b) by 234 days.

(21) Appl. No.: 15/030,610

(22) PCT Filed: Sep. 15, 2014

(86) PCT No.: PCT/EP2014/069594
§ 371 (c)(1),
(2) Date: Apr. 20, 2016

(87) PCT Pub. No.: WO2015/062775
PCT Pub. Date: May 7, 2015

(65) Prior Publication Data
US 2016/0311068 A1 Oct. 27, 2016

(30) Foreign Application Priority Data
Oct. 30, 2013 (DE) ........................ 10 2013 111 938

(51) Int. Cl.
*B23K 37/00* (2006.01)
*B23K 37/02* (2006.01)
(Continued)

(52) U.S. Cl.
CPC ............ *B23K 37/0241* (2013.01); *B23K 9/16* (2013.01); *B23K 9/323* (2013.01); *F23D 14/40* (2013.01); *F23D 14/52* (2013.01)

(58) Field of Classification Search
CPC .. B23Q 3/1546; F16L 37/004; F16L 2201/10; F16L 2201/60; B23B 31/28; B23K 9/323; Y10S 55/06
(Continued)

(56) References Cited

U.S. PATENT DOCUMENTS 2,209,558 A   7/1940  Bing et al.
2,972,485 A   2/1961  Ferchland
(Continued)

FOREIGN PATENT DOCUMENTS

CN    103025468 A   4/2013
DE      3319466 C1   5/1983
(Continued)

OTHER PUBLICATIONS

English Translation of International Search Report and Written Opinion from PCT/EP2014/069594.
(Continued)

*Primary Examiner* — Erin Barry Saad
(74) *Attorney, Agent, or Firm* — Warner Norcross and Judd LLP

(57) ABSTRACT

The invention relates to a welding tool coupling, in particular a hose-assembly interface or a welding torch handle, for connecting a welding tool (3), in particular a welding torch neck, to a supply line of a welding device, comprising a coupling device (2) for detachably coupling the welding tool (3) by means of a magnetic retaining force that can be switched on and off. According to the invention the coupling device (2) has at least one magnet system (10) and at least one short-circuit device, which can be moved in relation to each other between a switch-on position and a switch-off position in such a way that the magnetic flux generated by the magnet system (10) exits from the coupling device (2) in the switch-on position in such a way that the magnetic (Continued)

Figure 1:
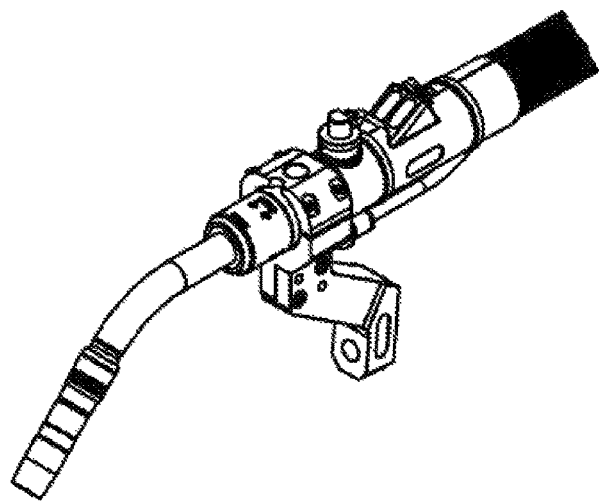

retaining force is generated and is at least partially short-circuited in the coupling device (2) by means of the short-circuit device in the switch-off position in such a way that the magnetic retaining force disappears. The invention further relates to a welding tool (3) for coupling to such a welding tool coupling, and a welding device having such a welding tool coupling.

20 Claims, 3 Drawing Sheets

(51) Int. Cl.
    *B23K 9/16*     (2006.01)
    *B23K 9/32*     (2006.01)
    *F23D 14/40*     (2006.01)
    *F23D 14/52*     (2006.01)

(58) Field of Classification Search
USPC ......... 285/9.1; 335/295, 288, 302, 306, 298; 269/8
See application file for complete search history.

(56) References Cited

U.S. PATENT DOCUMENTS

| | | | |
|---|---|---|---|
| 3,181,895 A | 5/1965 | Cator | |
| 3,610,875 A | 10/1971 | Dal Molin | |
| 6,603,221 B1* | 8/2003 | Liu | H03K 17/725 307/125 |
| 6,800,983 B1* | 10/2004 | Iijima | G04C 10/00 310/254.1 |
| 2012/0212110 A1* | 8/2012 | Mueller | F04D 25/0613 310/67 R |

FOREIGN PATENT DOCUMENTS

| | | |
|---|---|---|
| DE | 20018124 U1 | 10/2000 |
| JP | 2004167583 A | 6/2004 |

OTHER PUBLICATIONS

International Search Report and Written Opinion from PCT/EP2014/069594 dated Feb. 25, 2015.

* cited by examiner

WELDING TOOL COUPLING HAVING AT LEAST ONE MAGNET SYSTEM AND AT LEAST ONE SHORT-CIRCUIT DEVICE, WELDING TOOL, AND WELDING DEVICE

The invention relates to a welding tool coupling, in particular to a hose assembly interface or to a welding torch handle, for connecting a welding tool, in particular a welding torch neck, to a supply line of a welding device, wherein, for the detachable coupling of the welding tool, the welding tool coupling has a coupling device by means of which a magnetic retaining force can be switched on and off.

The invention further relates to a welding tool for coupling to such a welding tool coupling as well as to a welding device with such a welding tool coupling.

A magnetic welding tool coupling of the type mentioned at the start is known, for example, from DE 200 18 124 U1, which describes a magnetic tool change system of a robotic arm for various tools, including welding tools. The tool change system has at least two coupling halves that are detachably connectable to one another via a separation plane, wherein one coupling half is associated with a movable robotic arm and the other coupling half is associated with the welding tool. The welding tool is connected to the robotic arm via a magnetic retaining mechanism which is based on the fact that one coupling half comprises a ferromagnetic material and the other coupling half comprises a stationary permanent magnet and/or electromagnet system, by which the corresponding ferromagnetic coupling half is magnetically attracted. When an electromagnet is used alone or in combination with a permanent magnet, the retaining force can moreover be switched on and off, wherein, in the case of a permanent electromagnet system, the electromagnet amplifies the retaining force of the permanent magnet in the switch-on position and weakens it by appropriate pole reversal or completely compensates for it in the switch-off position. However, for switching the magnetic retaining force on and off, a switchable electromagnet is needed in each case, for which a technically complicated electrical switching device must be present.

The object of the present invention is to improve a welding tool coupling, a welding tool as well as welding device of the type mentioned at the start, to the effect that the welding tool can be connected to the welding tool coupling as easily as is technically possible, in particular without the involvement of an electrical switching device and preferably by only one operator.

This object is attained by a welding tool coupling according to claim 1, a welding tool according to claim 20 as well as a welding device according to claim 24. Advantageous designs of the invention are the subject matter of the dependent claims.

The welding tool coupling according to the invention, which has a magnetic retaining force that can be switched on and off, is characterized in that the coupling device has at least one magnet system and at least one short-circuit device, which are movable relative to one another between a switch-on position and a switch-off position in such a way that the magnetic flux generated by the magnet system exits from the coupling device in the switch-on position in such a way that the magnetic retaining force is generated, and is at least partially short-circuited in the coupling device by means of the short-circuit device in the switch-off position in such a way that the magnetic retaining force disappears.

In an inventive manner according to the invention, it was recognized that the switching on and off of the magnetic retaining force can be implemented by a purely mechanical movement of a magnet system relative to a short-circuit device, without having to use a special electric switching device for switching an electromagnet on and off. The solution according to the invention is based solely on the fact that the magnetic fluxes that are continuously generated by the first magnet system are led in the switch-on position through the short-circuit device out of the coupling device, and in the switch-off position, they are short-circuited at least partially in the coupling device.

For short-circuiting in the coupling device or for leading the magnetic flux out of the coupling device, according to a first advantageous embodiment of the invention, the short-circuit device can comprise an additional magnet system and/or at least one pole piece, by means of which the magnetic retaining force can be switched on and off. If the short-circuit device has at least one additional magnet system—hereafter referred to as second magnet system—, it is advantageously provided that the second magnet system amplifies the magnetic flux generated by the first magnet system in the switch-on position in particular outside of the coupling device, and short circuits and/or at least partially counteracts it in the switch-off position, so that the magnetic retaining force can be switched on and off simply by a purely mechanical movement of the two magnet systems relative to one another.

In a similar manner, the pole piece can also be used either for the short-circuiting or for leading out the flux generated by the first magnet system. For this purpose, according to yet another advantageous design of the invention, similar in terms of principle of action to a mechanical magnetic clamping plate or a mechanical magnet clamping chuck, the pole piece has at least two sections that are magnetically insulated from one another, which consist of a magnetically conductive material, in particular a ferromagnetic material, and which can be moved relative to the first magnet system, and, in particular, in such a way that the magnetic flux of the first magnet system, via the magnetically conductive sections, can either be short-circuited within the coupling device or led out to the exterior.

Naturally, it is also conceivable according to another advantageous design of the invention that the coupling device comprises a combination of a magnet system and a pole piece. Here, it is advantageous, in particular, if the second magnet system is formed and arranged so that the magnetic flux generated by the total of all the magnet systems exits or is led out via the pole piece from the coupling device in the switch-on position, as a result of which, overall, the strength of the magnetic retaining force is advantageously increased.

As a result, a coupling device formed in this manner with a magnet system-based or pole piece-based short-circuit device is characterized by a particularly simple operation and a very low susceptibility to failure.

In a manner similar to the construction of the pole piece out of at least two sections that are magnetically insulated from one another, in an additional advantageous design of the invention, it is possible to provide that the first and/or second magnet system respectively comprise(s) magnets having alternating poles and/or that are magnetically insulated from one another, in particular dipole magnets. Here, it is particularly advantageous if the first and the second magnet system is/are arranged relative to one another in such a way that, in the switch-on position, the poles of the magnets of the first magnet system adjoin respective like poles of the second magnet system, and, in the switch-off position, respective opposite poles of the magnets of the second magnet system. As a result, it is achieved that the magnetic flux generated by the total of all the magnet systems exits from the coupling device in the switch-on position in such a way that the magnetic retaining force is generated, and it is short-circuited at least partially in the coupling device in the switch off position in such a way that the magnetic retaining force disappears, or that the magnetic fluxes of the two magnet systems at least partially compensate in the switched-off position.

According to an additional advantageous embodiment of the invention, the magnets of the first and/or of the second magnet system can be formed as permanent magnets and/or as electromagnets. Permanent magnets have the advantage that an electrical power supply can be entirely dispensed with, which reduces the cost expenditure for the welding tool coupling. In addition, permanent magnets offer the advantage that the welding tool is still always reliably retained in the welding tool coupling even in case of a power failure. By comparison, electromagnets have the advantage that the magnetic retaining force can be varied by increasing or lowering the magnetic field-exciting current flow.

A particularly simple operation of the welding tool coupling can be achieved in that the coupling device is formed in the manner of a rotating coupling. For this purpose, according to a particularly advantageous design of the invention, it can be provided that the first magnet system is arranged on a switching element, in particular a ring-shaped switching element, preferably made of non-magnetizable material, which is mounted is such a manner that it can be moved relative to the short-circuit device, and, in particular, which is rotatably mounted about the longitudinal axis of the welding tool coupling.

Alternatively, it is naturally also possible that the short-circuit device is arranged on a switching element, in particular a ring-shaped switching element, preferably made of non-magnetizable material, which is mounted is such a manner that it can be moved relative to the short-circuit device, and, in particular, which is rotatably mounted about the longitudinal axis of the welding tool coupling.

In particular, if the coupling device is formed as a rotating coupling, it has been found to be advantageous to arrange the magnets of the first magnet system in the shape of a ring next to one another, preferably about a longitudinal axis of the welding tool coupling, wherein the pole pieces of the magnets are oriented in peripheral direction of the ring-shaped arrangement or perpendicular to the ring plane.

Additionally or alternatively, it is also possible to provide that the magnets of the second magnet system are arranged in the shape of a ring next to one another, preferably also about the longitudinal axis of the welding tool coupling, wherein the pole axes of the magnets are oriented either parallel to the ring plane or perpendicular to the peripheral direction of the ring-shaped arrangement. Due to such an arrangement of the two magnet systems and their pole axes, the switching off and switching on of the magnetic retaining force can be implemented particularly efficiently.

In order to achieve that the magnetic flux of the second magnet system, on the one hand, contributes to the magnetic retaining force in the switch-on position, and, on the other hand, at least partially counteracts the magnetic flux of the first magnet system in the switch-off position, it is advantageous, according to an additional embodiment of the invention, if the pole axis(es) of the first magnet system is or are oriented perpendicularly to the pole axis(es) of the second magnet system.

If the coupling device, formed in particular as a rotating coupling, additionally comprises a pole piece, then it is provided according to another advantageous embodiment of the invention that the magnetically insulated sections of the polar piece are formed to be ring segment-shaped and/or form a circular collar, preferably aligned coaxially to the longitudinal axis, on a front side of which, in the switch-on position, the welding tool to be connected is retained and/or on the other front side of which the first magnet system adjoins. By means of such an arrangement of the pole pieces, it is possible to achieve in a particularly simple manner that the pole piece in the switch-on position leads the magnetic flux of the first and possibly of the second magnet system out of the coupling device in the direction of the tool to be connected and, in the switch-off position, short-circuits it at least partially in the coupling device in such a way that the magnetic retaining force disappears.

In order to enhance the lines of the magnetic flux in the pole piece, in particular the short-circuiting of the magnetic flux in the switch-off position, it is provided, according to an additional advantageous design of the invention, that the pole piece comprises a hollow cylindrical extension which adjoins the magnetically insulated sections or the collar of the pole piece, preferably coaxially relative to the longitudinal axis, in the interior of the welding tool coupling.

For the magnetic insulation of the individual sections of the pole piece and of the individual magnets of the first and/or second magnet system that have, in particular, alternating poles, said magnets are separated and insulated magnetically from one another by magnetic insulators made of non-magnetizable, preferably diamagnetic material.

In a particularly advantageous embodiment of the invention, in which the coupling device has both a pole piece and also a second magnet system, in each case a magnet of the second magnet system is arranged between two adjacent sections of the pole piece, preferably in the area of the front side of the collar adjoining the first magnet system. Thereby, it is possible to ensure particularly effectively a switching on and off of the magnetic retaining force. In the switch-off position, in particular, the magnetic flux of the first magnet system is almost entirely short-circuited in the coupling device as a result of this arrangement of the magnets of the second magnet system and of the sections of the pole piece.

In order to generate the strongest possible magnetic retaining force in the switch-on position, it is provided, in an additional advantageous embodiment of the invention, that, at least in the switch-off position, in each case a section of the pole piece adjoins a respective magnet of the first magnet system, wherein, preferably, at least in the area adjoining the magnets of the first magnet system, the sections preferably have a greater extent than the magnets themselves.

In order to achieve an additional amplification of the magnetic retaining force, a preferably ring-shaped soft iron element can be provided, which, on one side of the first magnet system, preferably on the side facing away from the pole piece or the collar, the alternating poles of the magnets of the first magnet system are magnetically conductively connected to one another.

In order to achieve a mechanical guiding and an additional stabilization of the welding tool to be connected to the welding tool coupling, the welding tool coupling can have, according to an additional advantageous embodiment of the invention, at least one centering opening, preferably coaxial to its longitudinal axis, which can be made to engage with a corresponding centering extension on the welding tool.

Moreover, it is conceivable that the welding tool coupling has at least one media connection, preferably in the bottom of the centering opening, which, when the welding tool is being connected to the welding tool coupling, is operatively connectable to at least one corresponding media connection on the welding tool, preferably at the end of the centering extension. Possible media for consideration are, in particular, electrical current, gas and/or water, which should be available during the welding process in the welding tool.

A first independent idea of the invention relates to a welding tool, in particular to a welding torch neck, for coupling to the above-described welding tool coupling according to the invention.

According to a first advantageous embodiment of the invention, it is provided that, for the magnetic connection to the coupling device, preferably to the pole piece, particularly to the front side of the collar, the welding tool has at least one preferably ring-shaped contact element made of magnetizable material, by means of which the welding tool is attracted to the welding tool coupling due to the magnetic retaining force in the switch-on position.

As an aid for the introduction and as an additional stabilizing element for coupling the welding tool to the welding tool coupling, the welding tool—as described above—can have a centering extension which can be made to engage with the corresponding centering opening in the welding tool coupling.

Furthermore, the welding tool advantageously has, preferably in the centering extension, at least one media connection which, when the welding tool is being connected to the welding tool coupling, can be operatively connected to the at least one media connection in the welding tool coupling.

An additional independent idea of the invention relates to a welding device, in particular to a welding torch, with a welding tool coupling according to the invention and/or a welding tool according to the invention of the above-described type.

Additional purposes, advantages, features and application possibilities of the present invention result from the following description of an embodiment example in reference to the drawing. Here, all the features described and/or depicted by themselves or in any reasonable combination constitute the subject matter of the present invention, including independently of their summary in the claims or their back references.

Figure 2:
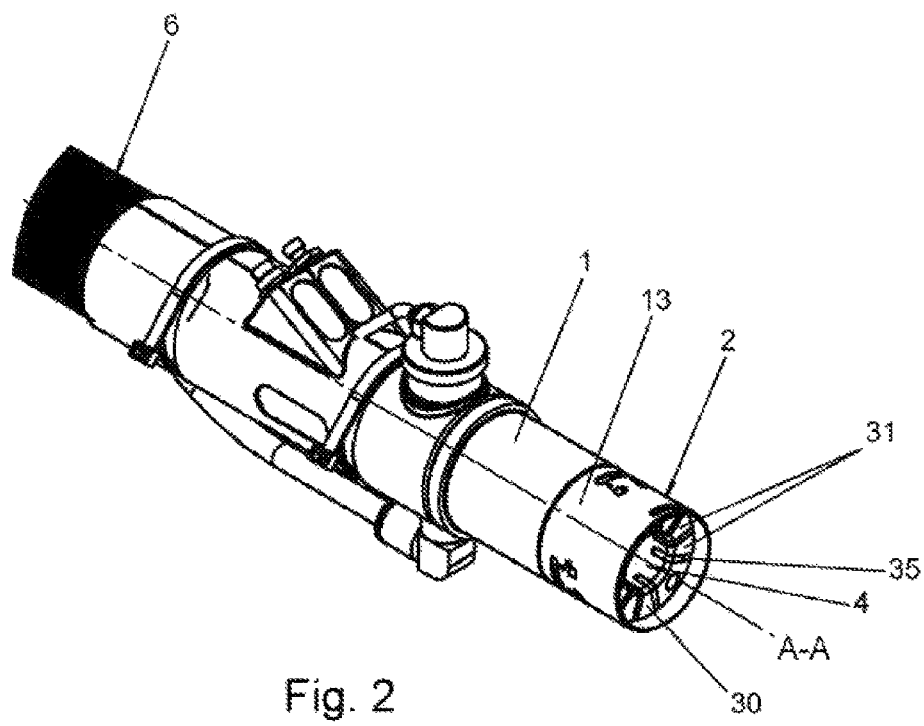
Figure 3:
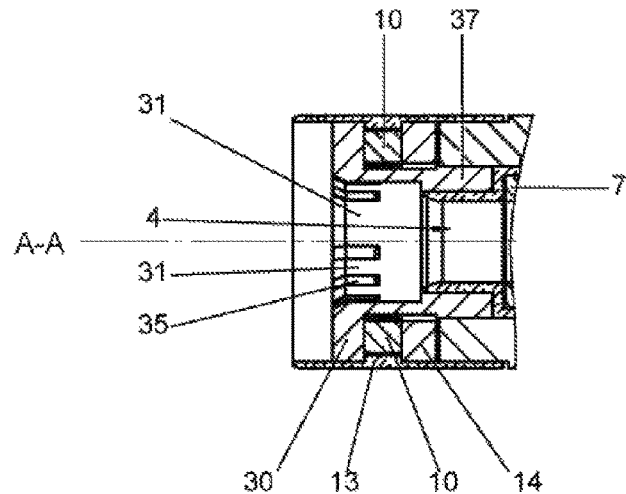
Figure 4:
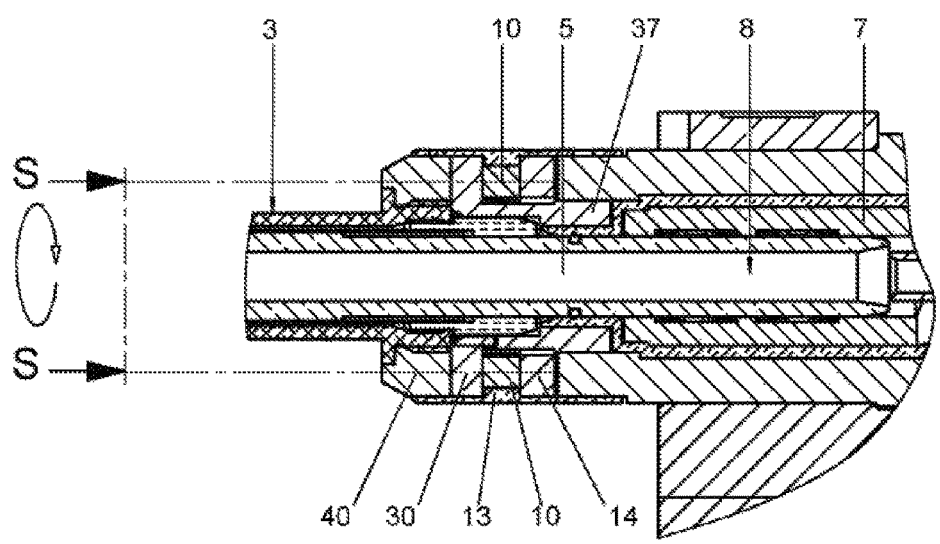
Figure 5:
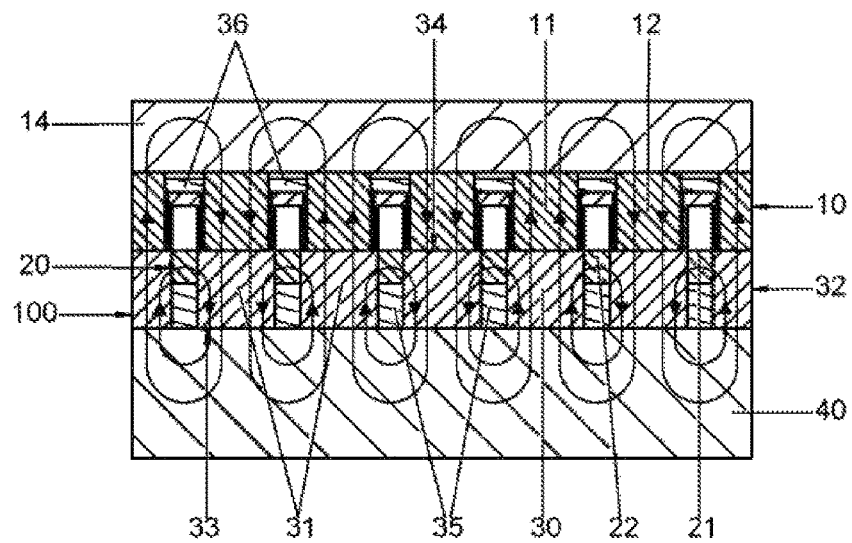
Figure 6:
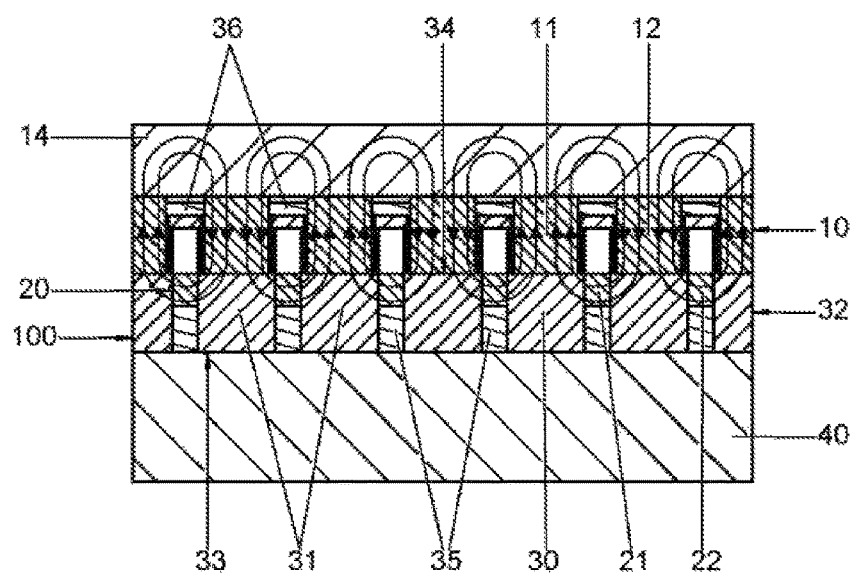

FIG. 1 shows a perspective representation of a possible embodiment example of a welding device according to the invention with a welding tool, a welding tool coupling and a supply line, FIG. 2 shows a perspective detailed representation of the welding tool coupling according to FIG. 1, FIG. 3 shows a detailed longitudinal section through the welding tool coupling according to FIG. 2, FIG. 4 shows a detailed longitudinal section through the welding tool coupling and the welding tool according to FIG. 1, FIG. 5 shows an unrolled cross-sectional representation of the welding tool coupling with coupled welding tool in the switch-on position along the cylindrical section S-S according to FIG. 4, and FIG. 6 shows an unrolled cross-sectional representation of the welding tool coupling with coupled welding tool in the switch-off position along the cylindrical section S-S according to FIG. 4.

FIG. 1 shows a possible embodiment example of a welding device according to the invention, in the present case a welding torch, which comprises a welding tool coupling 1 by means of which a welding tool 3, in the present case a welding torch neck, is connected to a supply line 6 of the welding device, wherein the connection of the welding tool 3 to the welding tool coupling 1 occurs via a coupling device 2 which, for the detachable coupling of the welding tool 3, generates a magnetic retaining force which can be switched on and off.

According to the invention, it is provided that the coupling device 2 comprises at least one magnet system 10 and at least one short-circuit device 100, which can be moved relative to one another between a switch-on position and a switch-off position in such a way that the magnetic flux generated by the magnet system 10 exits from the coupling device 2 in the switch-on position in such a way that the magnetic retaining force is generated, and is at least partially short-circuited in the coupling device 2 by means of the short-circuit device 100 in the switch-off position in such a way that the magnetic retaining force disappears.

In the embodiment examples of the welding tool coupling 1 according to the invention represented in FIGS. 1 to 6, the short-circuit device 100 comprises, in addition to the first magnet system 10, an additional magnet system 20, hereafter referred to as second magnet system 20, as well as a pole piece 30. As can be seen particularly in FIGS. 2, 5 and 6, the pole piece 30 comprises multiple sections 31 that are magnetically insulated from one another and consist of a magnetically conductive material, in the present case a ferromagnetic material. The magnetic insulation of the individual sections 31 of the pole piece 30 occurs by means of magnetic insulators 35, which consist of a non-magnetizable material, in the present case a diamagnetic material.

As can be seen, furthermore, from FIGS. 2 to 6, both the first and also the second magnet system respectively comprise multiple dipole permanent magnets 11, 12, 21, 22 which have alternating poles and are magnetically insulated from one another, wherein, in the present embodiment example, both the magnets 11, 12 of the first magnet system 10 and also the magnets 21, 22 of the second magnet system 20 are arranged in the shape of a ring next to one another about the longitudinal axis A-A of the welding tool coupling. While the pole axes of the magnets 11, 12 of the first magnet system are oriented perpendicular to the ring plane, i.e., parallel to the longitudinal axis A-A, the pole axes of the magnets 21, 22 of the second magnet system have an orientation parallel to the ring plane, i.e., perpendicular to the longitudinal axis A-A of the welding tool coupling 1.

In particular—as FIGS. 5 and 6 show—the first magnet system and the second magnet system 10, 20 are arranged in such a way relative to one another that the poles of the magnets 11, 12 of the first magnet system 10, in the switch-on position, adjoin respective like poles of the magnets 21, 22 of the second magnet system 20, and, in the switch-off position, respective opposite poles of same. As a result, it is achieved that, in the switch-on position, the second magnet system 20 amplifies the magnetic flux generated by the first magnet system 10 outside of the coupling device 2, and, in the switch-off position, short-circuits or at least partially counteracts said magnetic flux. Moreover, the object of the pole piece 30 is to allow the magnetic flux generated by the total of all the magnet systems 10, 20 to exit from the coupling device 2 in the switch-on position.

As can be seen particularly in FIGS. 2 to 6, the first magnet system 10 is arranged on a ring-shaped switching element 13 made of a non-magnetizable material, which is rotatably mounted relative to the short-circuit device 100 about the longitudinal axis A-A in the welding tool coupling 1. Correspondingly thereto, the pole piece is also formed to be in the shape of a ring or to have cylindrical symmetry. Accordingly, the magnetically insulated sections 31 of the pole piece 30 are formed in the shape of a ring segment and they constitute a circular collar 32 oriented coaxially relative to the longitudinal axis A-A, on the front side 33 of which collar the welding tool 3 to be connected is held in the switch-on position, and, on the other front side 34 of which, the first magnet system 10 adjoins.

In addition, the pole piece 30 has a hollow cylindrical extension 37 which adjoins the magnetically insulated sections 31 and the collar 32 coaxially relative to the longitudinal axis A-A in the interior of the welding tool coupling 1.

The concrete construction of the coupling device 100 can be obtained, in particular, from FIGS. 2 to 4, according to which in each case a magnet 21, 22 of the second magnet system 20 is arranged between adjacent sections 31 of the pole piece 30, in the area of the front side 34 of the collar 32 that adjoins the first magnet system 10.

The switching on and off of the magnetic retaining force occurs in that the switching element 13, in which the first magnet system 10 is arranged, is turned relative to the short-circuit device 100 by an angle which corresponds to the angular separation between two adjacent magnets 21, 22 of opposite poles of the second magnet system 20. Accordingly, FIG. 5 shows the position of the coupling device 100 in the switch-on position, while, in FIG. 6, the coupling device 100 is represented in the switch-off position. In the switch-on position, the magnetic flux generated by the first magnet system 10 is amplified by the second magnet system 20 and led, via the pole piece 30 or the sections 31 thereof, out of the coupling device 2 via the front side 33 and led into the ring-shaped contact element 40 of the welding tool 3, which consists of magnetizable material and lies against the front side 33, as a result of which the welding tool 3 to be connected is magnetically retained on the welding tool coupling 1 in the switch-on position. By comparison, in the switch-off position, the magnetic flux generated by the first magnet system 10, due to the changed pole arrangement of the second magnet system 20 relative to the first magnet system 10, is short-circuited or counteracted at least partially in the coupling device 2, since, in this position, the poles of the magnets 11, 12 of the first magnet system 10 adjoin respective opposite poles of the magnets 21, 22 of the second magnet system.

In order to allow the magnetic retaining force to exit as efficiently as possible into the outer area of the coupling device 2 in the switch-on position, it is particularly advantageous if—as in the present embodiment example according to FIGS. 1 to 6—at least in the switch-on position each magnet 11, 12 of the first magnet system 10 adjoins a respective section 31 of the pole piece 30, wherein, at least in the area adjoining the magnets 11, 12, the sections 31 have a greater lateral extent than the magnets 11, 12 of the first magnet system 10.

In order to amplify the magnetic retaining force in the connection area of the coupling device 100, a ring-shaped soft iron element 14 is provided additionally, which magnetically conductively connects the alternating poles of the magnets 11, 12 to one another on the side facing away from the pole piece 30 or from the collar 32.

In addition, in the present embodiment example according to FIGS. 1 to 6, for connecting the welding tool 3 to the welding tool coupling 1, a centering opening 4 extending coaxially relative to the longitudinal axis A-A is provided, which can be made to engage with a corresponding centering extension 5 on the welding tool 3. As can be seen particularly in FIG. 4, in the bottom of the centering opening 4, a media connection 7 is provided additionally, which, when the welding tool 3 is being connected to the welding tool coupling 1, can be operatively connected to a corresponding media connection 8 at the end of the centering extension 5 of the welding tool 3. Starting from this media connection 8, a media line extends further through the welding tool 3 up to the tip of the tool.

LIST OF REFERENCE NUMBERS

1 Welding tool coupling
2 Coupling device
3 Welding tool
4 Centering opening
5 Centering extension
6 Supply line
7 Media connection in the welding tool coupling
8 Media connection in the welding tool
10 First magnet system
11 Magnet
12 Magnet
13 Switching element
20 Second magnet system
21 Magnet
21 Magnet
30 Pole piece
31 Magnetically insulated sections
32 Collar
33 A front side of the pole piece
34 Another front side of the pole piece
35 Magnetic insulators
36 Magnetic insulators
37 Extension
40 Contact element
100 Short-circuit device
A-A Longitudinal axis of the welding tool coupling

The invention claimed is:

1. A welding tool coupling (1), including a hose assembly interface or a welding torch handle, for connecting a welding tool (3), including a welding torch neck, to a supply line (6) of a welding device, with a coupling device (2) for the detachable coupling of the welding tool (3) by means of a magnetic retaining force that can be switched on and off, characterized in that the coupling device (2) comprises at least one magnet system (10) and at least one short-circuit device (100), which can be moved relative to one another between a switch-on position and a switch-off position in such a way that the magnetic flux generated by the magnet system (10) exits from the coupling device (2) in the switch-on position in such a way that the magnetic retaining force is generated and is at least partially short-circuited in the coupling device (2) by means of the short-circuit device (100) in the switch-off position in such a way that the magnetic retaining force disappears.

2. The welding tool coupling (1) according to claim 1, characterized in that the short-circuit device (100) comprises at least a second magnet system (20) and/or at least one pole piece (30).

3. The welding tool coupling (1) according to claim 2, characterized in that the magnetic flux generated by the total of the magnet system (10) and the at least the second magnet system (20) in the switch-on position exits via the pole piece (30) from the coupling device (2).

4. The welding tool coupling (1) according to claim 2, characterized in that the magnet system (10) comprises multiple magnets (11, 12), including dipole magnets, with alternating poles and/or magnetically insulated from one another.

5. The welding tool coupling (1) according to claim 4, characterized in that the magnets (11, 12; 21, 22) of the first and/or of the at least second magnet system (10; 20) is/are formed as permanent magnets and/or electromagnets.

6. The welding tool coupling (1) according to claim 4, characterized in that the first magnet system and the at least second magnet system (10; 20) are arranged relative to one another in such a way that, in the switch-on position, the poles of the magnets (11, 12) of the first magnet system (10) adjoin respective like poles of the magnets (21, 22) of the second magnet system (20), and, in the switch-off position, respective opposite poles of same.

7. The welding tool coupling (1) according to claim 4, characterized in that
   a. the magnets (11, 12) of the first magnet system (10) are arranged in the shape of a ring next to one another, about a longitudinal axis (A-A) of the welding tool coupling (1), wherein the pole axes of the magnets (11, 12) are oriented in peripheral direction of the ring-shaped arrangement or perpendicular to the ring plane, and/or in that
   b. the magnets (21, 22) of the second magnet system (20) are arranged in the shape of a ring next to one another, about the longitudinal axis (A-A) of the welding tool coupling (1), wherein the pole axes of the magnets (21, 22) are arranged parallel to the ring plane or perpendicular to the peripheral direction of the ring-shaped arrangement.

8. The welding tool coupling (1) according to claim 2, characterized in that the pole axis(es) of the first magnet system (10) is/are oriented perpendicular to the pole axis(es) of the at least second magnet system (20).

9. The welding tool coupling (1) according to claim 1, characterized in that
   a. the first magnet system (10) is arranged on a switching element (13), including a ring-shaped switching element, made of a non-magnetizable material, which is mounted so that it can be moved relative to the short-circuit device (100), including rotatably mounted about the longitudinal axis (A-A) of the welding tool coupling (1), or
   b. the short-circuit device (100) is arranged on a switching element (13), including a ring-shaped switching element made of a non-magnetizable material, which is mounted so that it can be moved relative to the first magnet system (10), including rotatably mounted about the longitudinal axis (A-A) of the welding tool coupling (1).

10. The welding tool coupling (1) according to claim 1, characterized in that the sections (31) of the pole piece (30) and/or the magnets (11, 12) of the first magnet system (10) is/are magnetically insulated from one another by means of magnetic insulators (35, 36) made of a non-magnetizable, diamagnetic, material.

11. The welding tool coupling (1) according to claim 2, characterized in that each magnet (21, 22) of the at least second magnet system (20) is arranged between two adjacent sections (31) of the pole piece (30), in the area of the front side (34) of the collar (32) that adjoins the first magnet system (10).

12. The welding tool coupling (1) according to claim 1, characterized in that, at least in the switch-on position, in each case a section (31) of the pole piece (30) adjoins a respective magnet (11, 12) of the first magnet system (10), wherein, at least in the area adjoining the magnets (11, 12) of the first magnet system (10), the sections (31) have a greater lateral extent than the magnets (11, 12).

13. The welding tool coupling (1) according to claim 4, characterized in that a ring-shaped soft iron element (14) is provided, which, on one side of the first magnet system (10), on the side facing away from the pole piece (30) or the collar (32), magnetically conductively connects the alternating poles of the magnets (11, 12) to one another.

14. The welding tool coupling (1) according to claim 1, characterized in that at least one centering opening (4), coaxial to the longitudinal axis (A-A), is provided, which can be made to engage with the corresponding centering extension (5) on the welding tool (3).

15. The welding tool coupling (1) according to claim 1, characterized in that at least one media connection (7), in the bottom of the centering opening (4), is provided, which, when the welding tool (3) is being connected to the welding tool coupling (1), can be operatively connected to at least one corresponding media connection (8) on the welding tool (3), at the end of the centering extension (5).

16. A welding tool (3), including a welding torch neck, for the coupling to a welding tool coupling (1) according to claim 1.

17. The welding tool (3) according to claim 16, characterized in that, for the magnetic connecting to the coupling device (2), to the pole piece (30), particularly to the front side (33) of the collar (32), a ring-shaped contact element (40) made of magnetizable material is provided.

18. The welding tool (3) according to claim 16, characterized in that a centering extension (5) is provided, which can be made to engage with the corresponding centering opening (4) in the welding tool coupling (1).

19. The welding tool (3) according to claim 16, characterized in that at least one media connection (8) is provided, in the centering extension (5), which, when connecting the welding tool (3) to the welding tool coupling (1), can be operatively connected to the at least one media connection (7) in the welding tool coupling (1).

20. A welding device, including a welding torch, with a welding tool coupling (1) according to claim 1 and/or with a welding tool (3) according to claim 16.

* * * * *

UNITED STATES PATENT AND TRADEMARK OFFICE
CERTIFICATE OF CORRECTION

Page 1 of 1

PATENT NO. : 9,987,711 B2
APPLICATION NO. : 15/030610
DATED : June 5, 2018
INVENTOR(S) : Gabriel Jesser It is certified that error appears in the above-identified patent and that said Letters Patent is hereby corrected as shown below:

In the Claims

Column 8, Claim 4, Line 61:
"claim 2" should be -- claim 1 --

Column 8, Claim 4, Line 62:
"the magnet system (10)" should be -- the at least one magnet system (10) --

Signed and Sealed this
Ninth Day of October, 2018

Andrei Iancu
*Director of the United States Patent and Trademark Office*